Patented Jan. 19, 1926.

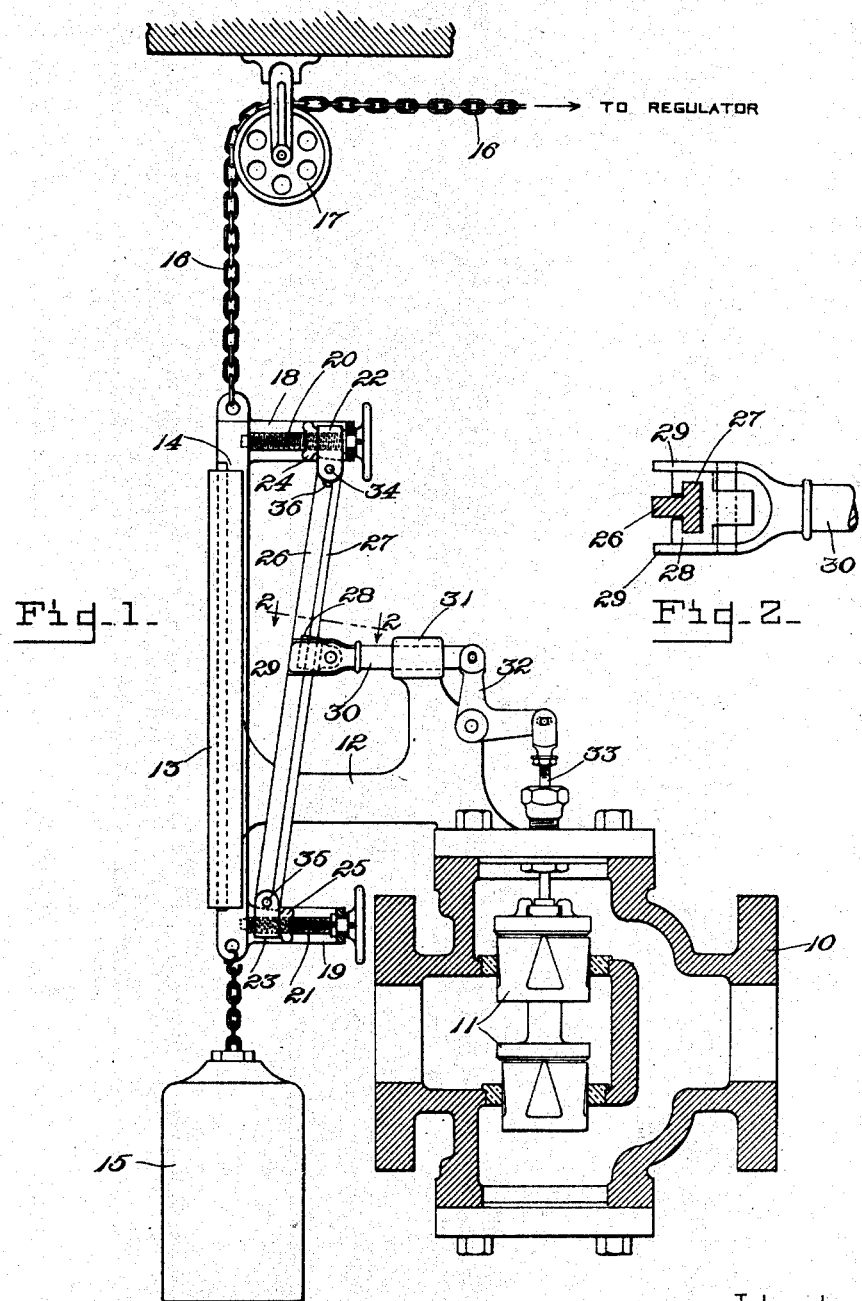

1,569,852

UNITED STATES PATENT OFFICE.

HAROLD L. COLBY, OF MILTON, MASSACHUSETTS, ASSIGNOR TO CHARLES W. McCON-NEL, OF BOSTON, MASSACHUSETTS, ELDON MACLEOD, OF WESTWOOD, MASSACHU-SETTS, AND FANNIE BURR LOOK, OF LOS ANGELES, CALIFORNIA, TRUSTEES, DO-ING BUSINESS AS MASON REGULATOR COMPANY, OF BOSTON, MASSACHUSETTS.

VALVE MECHANISM.

Application filed November 7, 1923. Serial No. 673,390.

*To all whom it may concern:*

Be it known that I, HAROLD L. COLBY, a citizen of the United States, residing at Milton, county of Norfolk, State of Massachusetts, have invented a certain new and useful Improvement in Valve Mechanisms, of which the following is a specification, reference being had therein to the accompanying drawings.

This invention relates to valve operating mechanism, and especially, although not exclusively, to valve mechanism employed in connection with automatic regulating systems for steam boiler furnaces.

In certain systems of this kind the regulation of the combustion is effected through a valve which is operated by a device responsive to boiler pressure, and which, in turn, controls the flow of a fluid such, for example, as oil or steam to a liquid fuel burner, air to a grate, or steam to a blowing engine. In such a system it is necessary that the valve operating mechanism be so designed as to be capable of closing the valve completely, or of opening the same far enough to provide for any possible requirements, although, under any given set of working conditions, only a portion of this range of opening and closing movement is used. On the other hand, it is desirable, under any conditions, to utilize the entire range of movement of the regulator and to cause the opening and closing movements of the valve to be at all times proportional in amount to the movements of the regulator. To this end, the present invention has for its object to provide a valve opening and closing mechanism adapted for connection with and operation by a regulator of the character referred to, said mechanism being adjustable to vary both limits of movement (opening and closing) of the valve, but being of such a character that the entire range of movement of the regulator is required in order to move the valve between the limits so adjusted, the movements of the valve between these variable limits being at all times proportional to the movements of the regulator between the fixed limits of the latter.

The foregoing and other objects of the invention, together with means whereby the latter may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise embodied without departure from the spirit and scope thereof.

In said drawings:

Fig. 1 is a somewhat diagrammatic side elevation of the valve and its operating mechanism, the valve casing being shown in section.

Fig. 2 is a detail section taken on the line 2—2, Fig. 1.

The conduit for the fluid to be controlled includes a casing 10 for a valve 11 adapted to control the flow of fluid through said conduit, which valve, as herein shown, is of the balanced, gradual opening type shown and described in Letters Patent No. 1,285,769, issued November 26, 1918, on an application filed by George S. Melcher. Mounted on the valve casing 10 is a bracket 12 which supports a fixed, vertical guideway 13. Guided for vertical movement in the guideway 13 is an operating member in the form of a slide 14. Said slide has hung upon its lower end a weight 15 tending to move the same downwardly, and has secured to its upper end a chain 16 which passes over one or more guide sheaves 17 and is connected at its opposite end to a regulator responsive to boiler pressure. The regulator is not shown herein, but may be of any suitable type, for example any of those shown in Letters Patent No. 1,291,063, issued January 14, 1919, on an application filed by George S. Melcher. The slide 14 is moved upwardly by the regulator through the chain 16 and downwardly by the weight 15 when permitted by the regulator, its movements corresponding directly to those of the regulator.

Projecting laterally from the operating member or slide 14 are two arms or brackets 18 and 19 in which are journalled two adjusting screws 20 and 21 disposed with their axes transverse to the direction of movement of said operating slide in the guideway 13. In threaded engagement with the screws 20 and 21 are nuts 22 and 23 which may be adjusted toward and from the slide 14 by operation of said screws and which may be held in any position of adjustment by lock nuts 24 and 25. The nuts 22 and 23 are provided with ears to which are pivoted, as at 34 and 35, the opposite ends respectively of a substantially straight cam bar 26, whereby said cam bar is supported and said nuts held against rotation when the screws 20 and 21 are turned. By operation of the screws 20 and 21, the positions of the upper and lower ends, respectively, of the cam bar 26, and consequently the inclination of said cam bar to the slide 14, may be independently adjusted, one or both of the pivots 34 and 35 being received in a slot or slots in said cam bar, as shown at 36, in order to permit such adjustment. The cam bar 26 is formed with an edge flange 27 which is engaged by a shoe 28 pivotally mounted within the bifurcated end 29 of a rod 30 guided for longitudinal movement in a guide 31 formed on the bracket 12. The opposite end of the rod 30 is connected with one arm of a bell crank lever 32 pivoted to the bracket 12 and the other arm of which is connected with the stem 33 of the valve 11.

When the slide 14 is moved vertically under the control of the regulator, the rod 30 is moved laterally by the inclined cam bar 26 to open and close the valve 11 through the bell crank lever 32 and valve stem 33, the engagement of the shoe 28 with the flange 27 providing for a positive movement in both directions. As shown, the mechanism is arranged and adjusted to open the valve when the slide 14 moves upwardly and to close the valve when said slide moves downwardly, the range of movement of said slide being sufficiently less than the vertical distance between the ends of the cam bar 26 to permit continuous operative engagement between the shoe 28 and flange 27. Adjustment of the upper end of the cam bar by means of the screw 20 determines the limit of closing movement of the valve, while adjustment of the lower end of said cam bar by means of the screw 21 determines the limit of opening movement of said valve. Irrespective, however, of these limits, it will be seen that the complete range of movement of the slide 14 is required in order to cause a movement of the valve from one to the other. It will also be seen that, while adjustment of the cam bar varies the extent of movement imparted to the valve by a given movement of the operating slide, these movements, for a given adjustment, bear a fixed ratio to one another throughout their respective ranges.

Having thus described my invention, I claim:

1. The combination with a valve, of an operating member therefor having a predetermined range of operative movement, and means connecting said operating member and valve for causing opening or closing movements of said valve proportional in amount to the extent of movement of said operating member throughout the range of operative movement of the latter, said connecting means being adjustable to vary the limits of movement of said valve in either or both directions and thereby the extent of movement of said valve corresponding to a given movement of said operating member.

2. The combination with a valve, of an operating member therefor having a range of operative movement between fixed limits, and means connecting said operating member and valve for causing opening or closing movements of said valve proportional in amount to the extent of movement of said operating member throughout the range of operative movement of the latter, said connecting means being adjustable to vary both limits of movement of the valve independently.

3. The combination with a valve, of an operating member therefor having a range of operative movement between fixed limits, means operatively connecting said valve and operating member whereby movement of the latter between its limits causes corresponding movement of the former between limits, and means whereby both of said last named limits may be independently varied.

4. The combination with a valve, of an operating member therefor having a predetermined range of operative movement, and means connecting said operating member and valve for causing opening or closing movements of said valve in constant ratio to the movements of said operating member throughout the range of operative movement of the latter, said means including a cam and devices for adjustably connecting said cam with said operating member at a plurality of points.

5. The combination with a valve, of an operating slide, a rigid cam bar, means including adjusting screws for connecting both ends of said cam bar with said slide, a shoe cooperating with said cam bar and movable thereby in both directions, and means connected with said shoe for opening and closing said valve.

In testimony whereof I affix my signature.

HAROLD L. COLBY.